(12) United States Patent
Ieda et al.

(10) Patent No.: US 8,403,384 B2
(45) Date of Patent: Mar. 26, 2013

(54) DOOR HANDLE DEVICE

(75) Inventors: Kiyokazu Ieda, Kariya (JP); Hisashi Inaba, Kariya (JP); Takehiro Tabata, Kariya (JP); Tomoo Kakegawa, Toyota (JP); Tomoyuki Funayama, Toyota (JP); Shigeki Nishiyama, Toyota (JP)

(73) Assignees: Aisin Seiki Kabushiki Kaisha, Kariya-shi, Aichi-ken (JP); Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 260 days.

(21) Appl. No.: 12/670,583

(22) PCT Filed: Jul. 25, 2008

(86) PCT No.: PCT/JP2008/063389
§ 371 (c)(1),
(2), (4) Date: Jan. 25, 2010

(87) PCT Pub. No.: WO2009/017049
PCT Pub. Date: Feb. 5, 2009

(65) Prior Publication Data
US 2010/0192329 A1    Aug. 5, 2010

(30) Foreign Application Priority Data

Jul. 27, 2007   (JP) ................................. 2007-196121

(51) Int. Cl.
*E05D 3/00* (2006.01)
(52) U.S. Cl. ................. 292/336.3; 292/92; 292/DIG. 65
(58) Field of Classification Search ............... 292/336.3, 292/92, DIG. 65; 340/425.5, 34, 5.72; 70/262–266
See application file for complete search history.

(56) References Cited

U.S. PATENT DOCUMENTS
(Continued)

FOREIGN PATENT DOCUMENTS

| DE | 10 2005 041 551 A1 | 3/2007 |
|---|---|---|
| JP | 2002-57564 A | 2/2002 |

(Continued)

OTHER PUBLICATIONS

English translation of International Preliminary Report on Patentability and Written Opinion issued by the International Bureau of WIPO on Feb. 24, 2010 in International Application No. PCT/JP2008/063389.

(Continued)

*Primary Examiner* — Thomas A Beach
*Assistant Examiner* — Mark Williams
(74) *Attorney, Agent, or Firm* — Buchanan Ingersoll & Rooney P.C.

(57) ABSTRACT

A door handle device capable of operating a door opening/closing mechanism of a vehicle is disclosed. The door handle device includes a support member, a door handle, a circuit substrate, a lock detection electrode, a capacitance sensor, and an auxiliary electrode. The circuit substrate is arranged in the door handle and includes a ground electrode. The lock detection electrode is mounted on the circuit substrate and capacitance-coupled to an outer panel of the door. The capacitance sensor is connected to the lock detection electrode and detects the issuance of a door lock command based on a change in a first capacitance between the outer panel and the lock detection electrode. The auxiliary electrode is capacitance-coupled to the ground electrode to form a second capacitance connected in parallel to the first capacitance between the auxiliary electrode and the ground electrode.

15 Claims, 5 Drawing Sheets

U.S. PATENT DOCUMENTS

| | | | |
|---|---|---|---|
| 6,577,228 B1 * | 6/2003 | Tsuchida et al. | 340/5.72 |
| 6,698,262 B2 | 3/2004 | Wittwer | |
| 7,091,823 B2 | 8/2006 | Ieda et al. | |
| 7,132,768 B2 * | 11/2006 | Ieda et al. | 307/652 |
| 7,210,715 B2 | 5/2007 | Kobayashi et al. | |
| 7,233,080 B2 | 6/2007 | Garnault et al. | |
| 7,810,856 B2 | 10/2010 | Muller et al. | |
| 7,819,442 B2 | 10/2010 | Ieda et al. | |
| 7,931,314 B2 | 4/2011 | Nitawaki et al. | |
| 7,984,938 B2 | 7/2011 | Tanimoto et al. | |
| 2003/0009855 A1 * | 1/2003 | Budzynski | 16/443 |
| 2003/0122556 A1 | 7/2003 | Sueyoshi et al. | |
| 2005/0231364 A1 | 10/2005 | Nitawaki et al. | |
| 2006/0143857 A1 | 7/2006 | Freyholdt et al. | |
| 2006/0232378 A1 * | 10/2006 | Ogino et al. | 340/5.62 |
| 2007/0091627 A1 | 4/2007 | Nitawaki et al. | |
| 2007/0096905 A1 | 5/2007 | Ieda et al. | |
| 2007/0115191 A1 | 5/2007 | Hashiguchi et al. | |
| 2007/0126246 A1 | 6/2007 | Suzuki et al. | |
| 2007/0216174 A1 | 9/2007 | Tanimoto et al. | |
| 2007/0216175 A1 | 9/2007 | Tanimoto et al. | |
| 2008/0061933 A1 | 3/2008 | Ieda et al. | |
| 2009/0279826 A1 | 11/2009 | Ieda et al. | |

FOREIGN PATENT DOCUMENTS

| | | |
|---|---|---|
| JP | 2002-295094 A | 10/2002 |
| JP | 2003-221949 A | 8/2003 |
| JP | 3502848 B2 | 12/2003 |
| JP | 2004-169426 A | 6/2004 |
| JP | 2005-134178 A | 5/2005 |
| JP | 2007-142784 A | 6/2007 |
| JP | 2007-247219 A | 9/2007 |
| WO | WO 03/029049 A2 | 4/2003 |
| WO | WO 03/030365 A1 | 4/2003 |
| WO | WO 03/071067 A1 | 8/2003 |
| WO | WO 03/071068 A1 | 8/2003 |
| WO | WO 03/095776 A1 | 11/2003 |
| WO | WO 2006/069633 A1 | 7/2006 |
| WO | WO 2009/017047 A1 | 2/2009 |
| WO | WO 2009/017048 A1 | 2/2009 |

OTHER PUBLICATIONS

International Search Report (PCT/ISA/210) issued on Oct. 1, 2008 by the Japanese Patent Office as the International Search Authority in International Application No. PCT/JP2008/063389.

Search Report issued Mar. 10, 2011 by the European Patent Office in European Application No. 08791631.8.

* cited by examiner

DOOR HANDLE DEVICE

TECHNICAL FIELD

The present invention relates to a door handle device implementing a function for detecting a lock command or the like for a vehicle door.

BACKGROUND ART

Nowadays, the so-called Smart Entry System (registered trademark) is used in door handle devices. In the Smart Entry System, communication is performed between a portable device, which is carried by a vehicle user, and a transceiver of a vehicle so as to, for example, recognize a vehicle user is approaching or leaving the vehicle and detect a lock command and an unlock command generated by the vehicle user to automatically lock and unlock the vehicle door. Patent Document 1 describes an example of such a conventional door handle device. FIG. 6 shows the front structure of the door handle device described in patent document 1. FIG. 7 shows the cross-sectional structure taken along line 7-7 in FIG. 6.

As shown in FIGS. 6 and 7, the door handle device has a door handle 100 including an outer panel 200 of the vehicle door and a grip 110, which defines an area into which a vehicle user's hand is insertable. The grip 110 includes an unlock sensor $S_{ULK}$, which is for detecting an unlock command generated by the vehicle user. An operation unit, which is for operating an opening/closing mechanism of the vehicle door, extends into the door through the outer panel 200 from one end 120 of the door handle 100. The end 120 includes a lock sensor $S_{LK}$, which is for detecting a lock command generated by the vehicle user. The lock sensor $S_{LK}$ and the unlock sensor $S_{ULK}$ (are each a capacitance sensor that detects changes in the capacitance and includes a detection electrode. The sensors $S_{LK}$ and $S_{ULK}$ each determine that the lock command or the unlock command has been issued when detecting a change in the capacitance that occurs when the vehicle user's hand approaches the corresponding detection electrode. For instance, when $C_{PANEL}$ represents a reference value for the capacitance between the outer panel 200 of the vehicle door and the detection electrode of the lock sensor $S_{LK}$, it is determined that the lock command has not been issued if the value of the capacitance detected by the lock sensor $S_{LK}$ does not greatly differ from the reference value $C_{PANEL}$. When the vehicle user's hand approaches the detection electrode, a new capacitance $C_T$, which is electrically connected in parallel to the capacitance $C_{PANEL}$, is formed between the detection electrode and the vehicle user's hand (synthesized capacitance $C_{PANEL}+C_T$). Since the value of the synthesized capacitance is greater than the reference value $C_{PANEL}$ by an amount corresponding to the capacitance $C_T$, it is determined that a lock command has been issued. This detection principle is applied in the same manner to the unlock sensor $S_{ULK}$. In the door handle device of patent document 1, the lock sensor $S_{LK}$ and the unlock sensor $S_{ULK}$ are arranged at different parts of the door handle 100. The lock command and the unlock command are thus distinguished from each other by the vehicle user touching these different parts of the door handle 100.

As shown in FIG. 7, the door handle device of patent document 1 includes a lock detection electrode (lock sensor $S_{LK}$) arranged in an area (area facing away from the outer panel 200) of the end of the grip 110 closer to the outer surface. Thus, when the vehicle user inserts his or her hand between the grip 110 and the outer panel 200 to perform an unlock operation and pulls the door handle 100 to open the door, the hand is apt to entering the detection range of the lock sensor $S_{LK}$. In such a case, accurate detections may be hindered since the detection of the unlock command by the unlock sensor $S_{ULK}$ and the detection of the lock command by the lock sensor $S_{LK}$ are simultaneously performed. Further, when the door is open, the vehicle user may perform unintentional operations such as the lock operation if the vehicle user's hand enters the detection range of the lock sensor $S_{LK}$.

[Patent Document 1] Japanese Patent No. 3502848

SUMMARY OF THE INVENTION

It is an object of the present invention to provide a door handle device that avoids unintentional operations when the vehicle user locks the door.

To achieve the above object, one object of the present invention is a door handle device arranged in a door of a vehicle and capable of operating a door opening/closing mechanism of the vehicle. The door handle device includes a support member arranged at an inner side of an outer panel of the door. A door handle is arranged on an outer side of the outer panel and includes a first end, a second end, a grip arranged between the first and second ends and defining a gap with an outer surface of the outer panel, a pivot portion extending through the outer panel from the first end and pivotally supported by the support member, and an operation portion extending through the outer panel from the second end so as to be capable of operating the opening/closing mechanism. A circuit substrate is arranged in the door handle and includes a ground electrode. A lock detection electrode is mounted on the circuit substrate and capacitance-coupled to the outer panel. A capacitance sensor is connected to the lock detection electrode, which detects issuance of a door lock command based on a change in a first capacitance between the outer panel and the lock detection electrode. An auxiliary electrode is capacitance-coupled to the ground electrode to form a second capacitance connected in parallel to the first capacitance between the auxiliary electrode and the ground electrode.

DETAILED DESCRIPTION OF THE PREFERRED EMBODIMENTS

One embodiment of a door handle device according to the present invention implementing the Smart Entry System (registered trademark) will now be discussed with reference to FIGS. 1 to 4.

Figure 1:
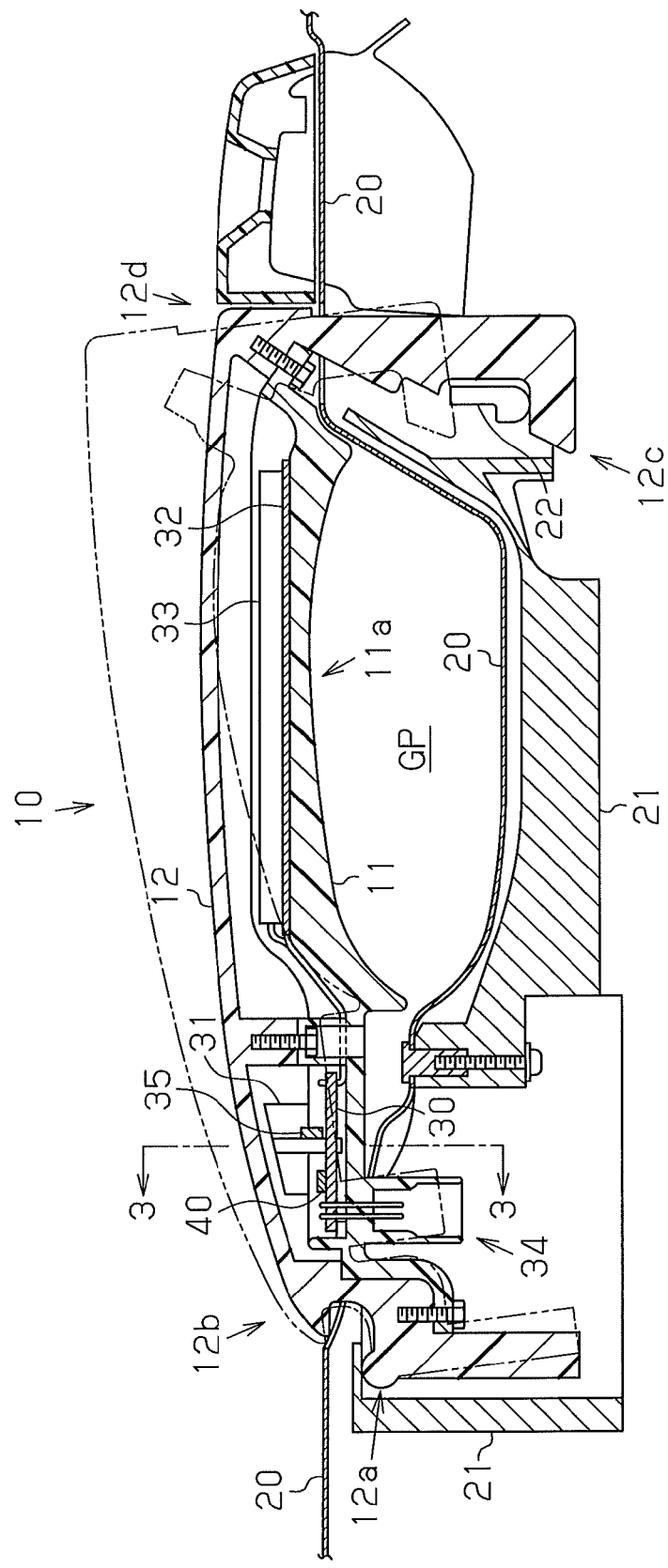
FIG. 1 is a cross-sectional view of a door handle device according to one embodiment of the present invention.

As shown in FIG. 1, a door handle device, which is capable of operating a door opening/closing mechanism of a vehicle, has a door handle 10 including a case, which is formed by a first handle case 11 and a second handle case 12. The first handle case 11 includes a grip 11a, which is gripped by a vehicle user. A gap GP is defined between the grip 11a and an outer surface of an outer panel 20 of the vehicle door. The second handle case 12 is fastened to the first handle case 11 by screws or the like to cover the first handle case 11 and form an outer portion of the door handle 10. In this manner, the case of the door handle 10 is formed by two segments (11 and 12). Thus, the door handle 10 has a high degree of freedom and convenience for design and manufacturing. The first handle case 11 and the second handle case 12 are both formed from a highly rigid resin material.

A support member 21 and a lever 22 of the door opening/closing mechanism are arranged in the outer panel 20. The second handle case 12 includes a first end 12b, which serves as a first portion, and a second end 12d, which serves as a second portion located opposite to the first end 12b with the grip 11a arranged in between. The support member 21 pivotally supports a pivot portion 12a, which extends from the first end 12b through the outer panel 20 and into the interior of the outer panel 20. An operation portion 12c, which is for operating the lever 22, extends from the second end 12d through the outer panel 20 and into the interior of the outer panel 20. When the vehicle user holds the grip 11a and pulls the door handle 10, the door handle 10 pivots about the first end 12b in a direction that moves out the second end 12d. This operates the lever 22 with the operation portion 12c and opens the vehicle door as long as the vehicle door is not in a locked state.

Figure 2:
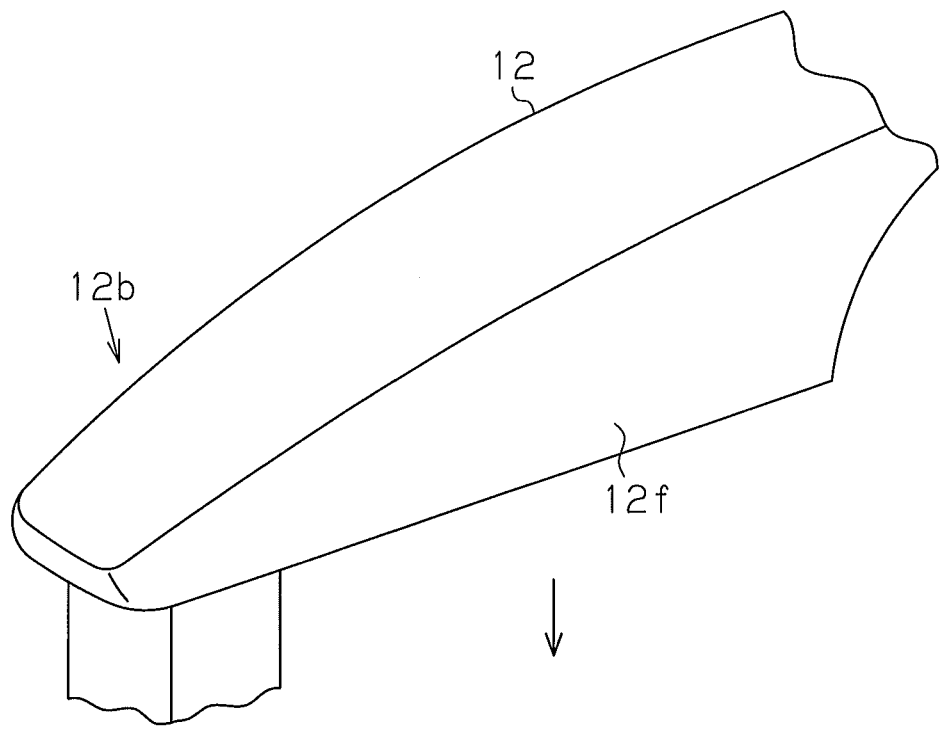
FIG. 2 is a perspective view showing an exploded structure of a portion from a first end to a grip of the door handle device of FIG. 1.
Figure 2:
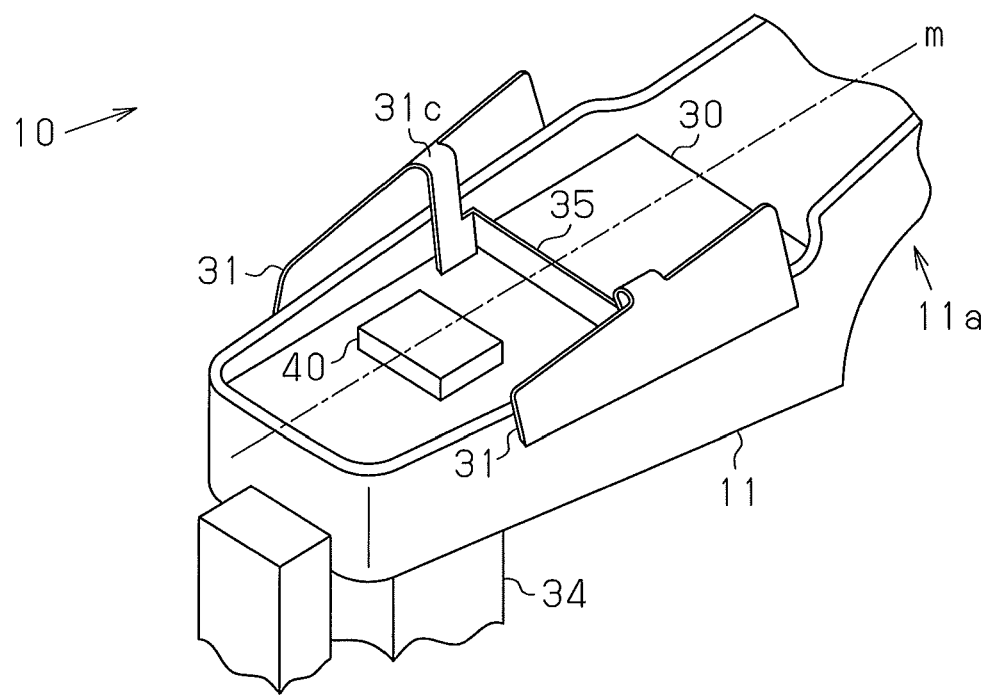
Figure 3:
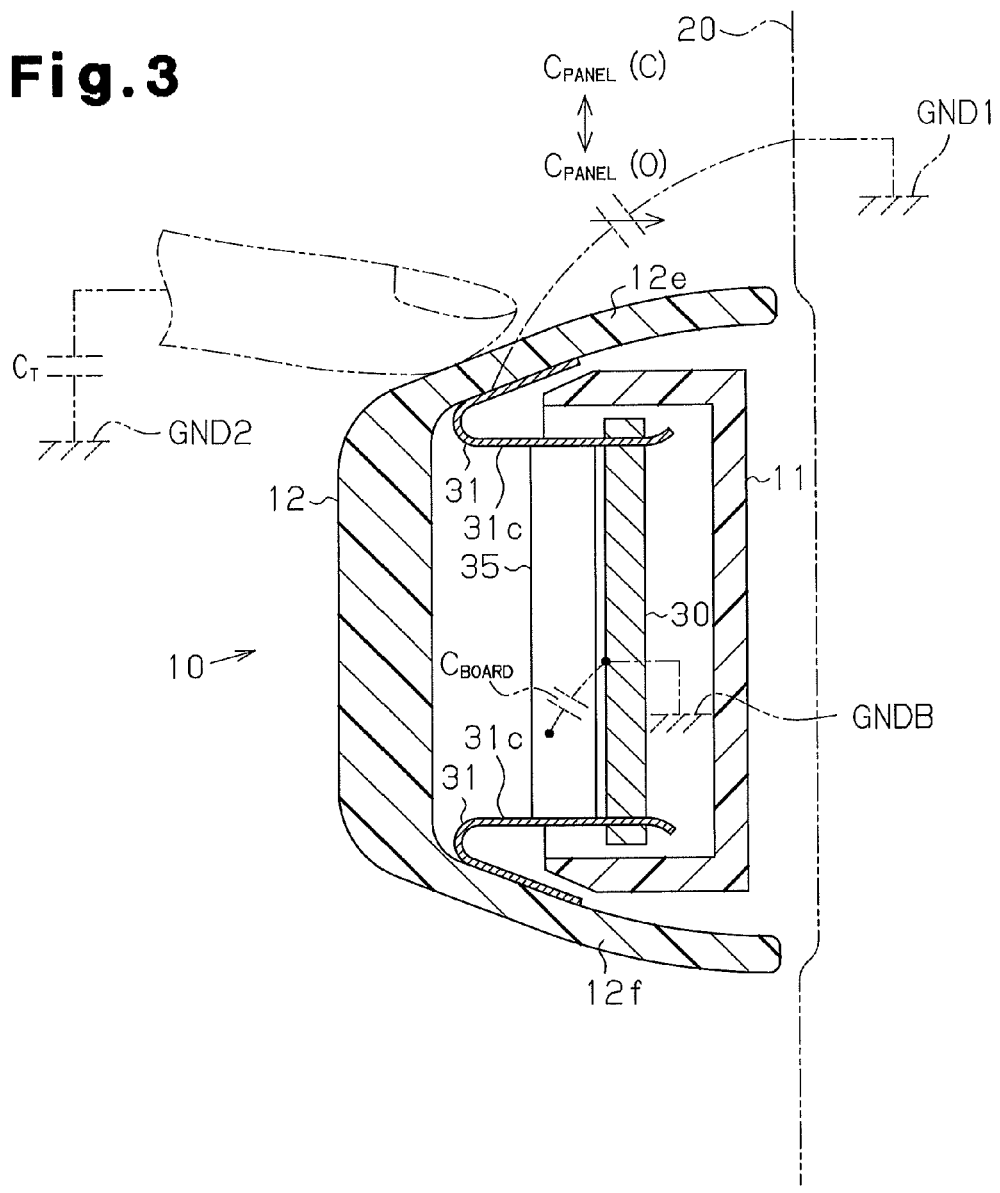
FIG. 3 is a cross-sectional view taken along line 3-3 in FIG. 1.

In the first handle case 11, a circuit substrate 30, on which various types of electronic components are mounted, is arranged between the grip 11a and the first end 12b. Although not particularly shown in the drawings, the interior of the handle case 11 is filled with a flexible resin (e.g., polyurethane, silicon etc.) so that the circuit substrate 30 is fixed to the case 11 and kept impervious to water due to the resin. A pair of lock detection electrodes 31 is mounted on the circuit substrate 30. The lock detection electrodes 31 are connected to a capacitance sensor 41, which detects the issuance of a door lock command of the vehicle door based on changes in the capacitance. As shown in FIGS. 2 and 3, each lock detection electrode 31 faces the inner surface of the second handle case 12, more specifically, the inner surfaces of the upper and lower walls 12e and 12f of the second handle case 12 and is arranged between the grip 11a and the first end 12b. The upward and downward directions as viewed in FIG. 4 correspond to the upward and downward directions of the vehicle. In the present embodiment, the lock detection electrodes 31 are located proximate to, or in contact with, the inner surfaces of the upper and lower walls 12e and 12f, respectively. A capacitance sensor 42 has an unlock detection electrode 32 electrically connected to a specific electrode that serves as a sensor input terminal arranged on the circuit substrate 30. The unlock detection electrode 32 detects the issuance of a door unlock command of the vehicle door based on changes in the capacitance. The unlock detection electrode 32 is arranged on the inner surface of the grip 11a. An antenna 33 is arranged on the inner surface of the grip 11a. Necessary information such as user authentication is exchanged between the antenna 33 and a portable device (not shown), which is carried by the vehicle user. The antenna 33 is electrically connected to a specific electrode that serves as a power supply terminal arranged on the circuit substrate 30. A sensor IC 40 including the capacitance sensors 41 and 42 is mounted on the circuit substrate 30. The supply of power to the sensor IC 40, the antenna 33, and the like, and the retrieval of the necessary information, such as output signals from the sensor IC 40, by a door control unit 60 (see FIG. 4) are performed through a connector 34, which is arranged on the rear surface of the circuit substrate 30.

The peripheral structure of the lock detection electrode 31 will now be discussed in detail with reference to FIG. 2.

The lock detection electrodes 31 are arranged in symmetry with respect to a center line m extending in the longitudinal direction of the door handle 10 from the first end 12b towards the second end 12d along the middle of the space between the upper and lower walls 12e and 12f. Each lock detection electrode 31 includes a connecting portion 31c serving as a supporting portion in the longitudinally central part of the lock detection electrode 31. As shown in FIG. 3, the connecting portion 31c is connected to the circuit substrate 30 so as to extend through the circuit substrate 30. This supports the lock detection electrode 31 on the circuit substrate 30 and electrically connects the lock detection electrode 31 to a circuit pattern on the circuit substrate 30. A plate-shaped auxiliary electrode 35 extends upright from the circuit substrate 30. That is, the auxiliary electrode 35 extends from the circuit substrate 30 to a predetermined height. The auxiliary electrode 35 is located between the lock detection electrodes 31. The two ends of the auxiliary electrode 35 are respectively connected to the two lock detection electrodes 31. Specifically, the two ends of the auxiliary electrode 35 are respectively connected to the connecting portions 31c of the two lock detection electrodes 31. The auxiliary electrode 35 is fixed to the circuit substrate 30 by the lock detection electrodes 31. Further, the auxiliary electrode 35 electrically and mechanically connects the two lock detection electrodes 31. Pressing is performed to integrally form the lock detection electrodes 31 and the auxiliary electrode 35.

The structure in which the lock detection electrodes 31 are arranged facing toward the inner surfaces of the upper and lower walls 12e and 12f of the second handle case 12 usually has shortcomings, which will now be discussed. First, referring to FIG. 1, when the vehicle holds the grip 11a and pulls the door handle 10, the door handle 10 is pivoted about the first end 12b the direction in which the second end 12d is moved out. The double-dashed line in FIG. 1 shows the door handle 10 in a state in which it is pulled out. As shown in FIG. 1, as the door handle 10 pivots, the distance of the portion between the first end 12b and the grip 11a from the outer panel 20 of the vehicle door changes. Therefore, referring to FIG. 3, the capacitance (first capacitance) $C_{PANEL}$ between the outer panel 20, which serves as ground GND1, and the lock detection electrode 31 changes between capacitance $C_{PANEL}$ (C) and capacitance $C_{PANEL}$ (O). The capacitance $C_{PANEL}$ (C) indicates the value of the capacitance $C_{PANEL}$ when the door handle 10 is not pulled, that is, when the vehicle door is closed. The capacitance $C_{PANEL}$ (O) indicates the value of the capacitance $C_{PANEL}$ when the door handle 10 is being pulled, that is, when opening the vehicle door. These values have a relationship of "$C_{PANEL}$ (O)<$C_{PANEL}$ (C)".

When the capacitance $C_{PANEL}$ changes as described above, the capacitance sensor 41, which detects the issuance of a door lock command of the vehicle door based on the capacitance $C_{PANEL}$, may generate an erroneous detection.

Figure 4:
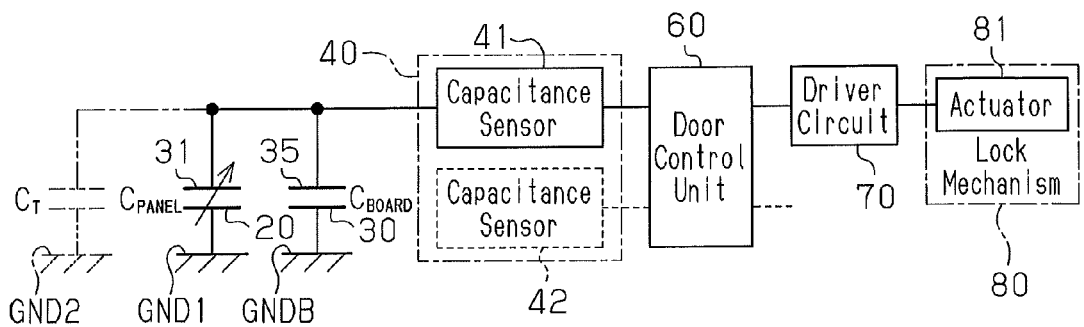
FIG. 4 is a block diagram mainly showing the structure of a door lock system in the door handle device of FIG. 1.

As shown in FIG. 3, the door handle device of the present embodiment arranges the auxiliary electrode 35 on the circuit substrate 30 to prevent erroneous detections of the capacitance sensor 41. In FIG. 3, ground GNDB represents a ground electrode arranged on the circuit substrate 30. Due to the arrangement of the auxiliary electrode 35, the auxiliary electrode 35 and the circuit substrate 30 are capacitance-coupled so as have a capacitance (second capacitance) $C_{BOARD}$ in between. The capacitance $C_{BOARD}$ and the capacitance $C_{PANEL}$ have an electrically parallel relationship. Furthermore, the auxiliary electrode 35 is arranged so that the capacitance $C_{BOARD}$ and the capacitance $C_{PANEL}$ have a relationship of "$C_{PANEL} < C_{BOARD}$". FIG. 4 is an equivalent circuit mainly showing a door lock system of the door handle device. As shown in FIG. 4, the value of the synthesized capacitance "$C_{PANEL}+C_{BOARD}$" of the capacitance $C_{PANEL}$ and the capacitance $C_{BOARD}$ is retrieved by the capacitance sensor 41 in the sensor IC 40 via the lock detection electrode 31 and the auxiliary electrode 35. In this case, the influence of the capacitance "$C_{BOARD}$" between the auxiliary electrode 35 and the circuit substrate 30 becomes large in the capacitance sensor 41. In other words, even when the value of the capacitance $C_{PANEL}$ changes between the capacitance $C_{PANEL}$ (C) and the capacitance $C_{PANEL}$ (O), as described above, the influence of such a change on the capacitance sensor 41 is reduced by the capacitance $C_{BOARD}$. This prevents erroneous detections or the like of the capacitance sensor 41.

In such a state, the vehicle user may touch with his or her hand a portion of the second handle case 12 facing the lock detection electrodes 31, as shown in FIG. 3. In FIG. 3, ground GND2 represents the vehicle user. In this case, the vehicle user and the lock detection electrode 31 are capacitance-coupled so as to form a capacitance $C_T$ in between. The capacitance $C_T$ and the capacitance $C_{PANEL}$ are in an electrically parallel relationship. Referring to FIG. 4, the capacitance sensor 41 retrieves the value indicating the synthesized capacitance "$C_{PANEL}+C_{BOARD}+C_T$". The capacitance sensor 41 detects issuance of the door lock command when the value of the synthesized capacitance is greater than the synthesized capacitance "$C_{PANEL}+C_{BOARD}$" by an amount corresponding to the capacitance $C_T$. In this case, even when the value of the capacitance $C_{PANEL}$ changes, the influence of the change on the capacitance sensor 41 is reduced by the value of the capacitance $C_{BOARD}$. Thus, the lock command detection of the vehicle door with the capacitance sensor 41 is highly reliable.

In the system shown in FIG. 4, the door control unit 60 determines that a door lock command has been issued by the vehicle user based on the detection signal of the capacitance sensor 41. The door control unit 60 then drives a lock actuator 81 arranged in a lock mechanism 80 via a driver circuit 70 to lock the vehicle door. The same detection principle and operational procedures are applied to an unlock system that unlocks the vehicle door through cooperation between the unlock detection electrode 32 and the capacitance sensor 42.

As described above, the door handle device of the present embodiment has the advantages described below.

(1) The auxiliary electrode 35 is arranged on the circuit substrate 30, on which the lock detection electrode 31 and the capacitance sensor 41 are mounted. The capacitance $C_{BOARD}$ between the auxiliary electrode 35 and the circuit substrate 30 is set to be greater than the capacitance $C_{PANEL}$ between the lock detection electrode 31 and the outer panel 20. The lock detection electrode 31 and the auxiliary electrode 35 are electrically connected so that the capacitance $C_{BOARD}$ and the capacitance $C_{PANEL}$ are electrically connected in parallel. Thus, the influence of the capacitance $C_{BOARD}$ between the auxiliary electrode 35 and the circuit substrate 30 becomes large in the capacitance sensor 41. Further, the influence on the capacitance sensor 41 of the change in the capacitance $C_{PANEL}$ between the lock detection electrode 31 and the outer panel 20 when the door handle 10 is pivoted is reduced by the capacitance $C_{BOARD}$ between the auxiliary electrode 35 and the circuit substrate 30. This prevents erroneous detections by the capacitance sensor 41 and allows for highly reliable lock detection of the vehicle door with the capacitance sensor 41.

(2) The lock detection electrodes 31 are arranged on the inner surfaces of the upper and lower walls 12e and 12f in the second handle case 12. Further, the auxiliary electrode 35, which extends from the lock detection electrodes 31, is plate-shaped and arranged upright on the circuit substrate 30. This allows for the vehicle user's hand to be located outside the detection range of the lock detection electrode 31 when carrying out a door handle operation. Additionally, the upright arrangement of the auxiliary electrode 35 on the circuit substrate 30 easily increase the entire area of the lock detection electrode 31, which includes the auxiliary electrode 35, and thereby increases the capacitance input to the capacitance sensor 41. This further increases the reliability of the vehicle door lock detection. Further, the formation of the lock detection electrode 31 and the auxiliary electrode 35 is facilitated.

(3) The two lock detection electrodes 31 are arranged in symmetry with respect to the center line m, which extends from the first end 12b to the second end 12d. In other words, the two lock detection electrodes 31 are arranged to be symmetric in the vertical direction when the door handle is attached to the vehicle door. This normalizes the door handle device and allows for versatile use. Specifically, the door handle device is versatile and basically has the same structure regardless of whether it is used for any door of a vehicle, such as the right door, the left door, and the rear doors. The auxiliary electrode 35 electrically and mechanically connects the two lock detection electrodes 31. This further facilitates auxiliary electrode formation.

(4) The unlock detection electrode 32 of the vehicle door is arranged in the grip 11a of the door handle. Thus, the door unlock command is issued when the vehicle user holds and operates the door handle to open the vehicle door. This distinguishes a door lock command from a door unlock command in a desirable manner. In other words, the capacitance sensor 41 and 42 more accurately detect whether the vehicle user intends to lock or unlock the vehicle door.

The above-described embodiment may also be practiced as discussed below.

Figure 5:
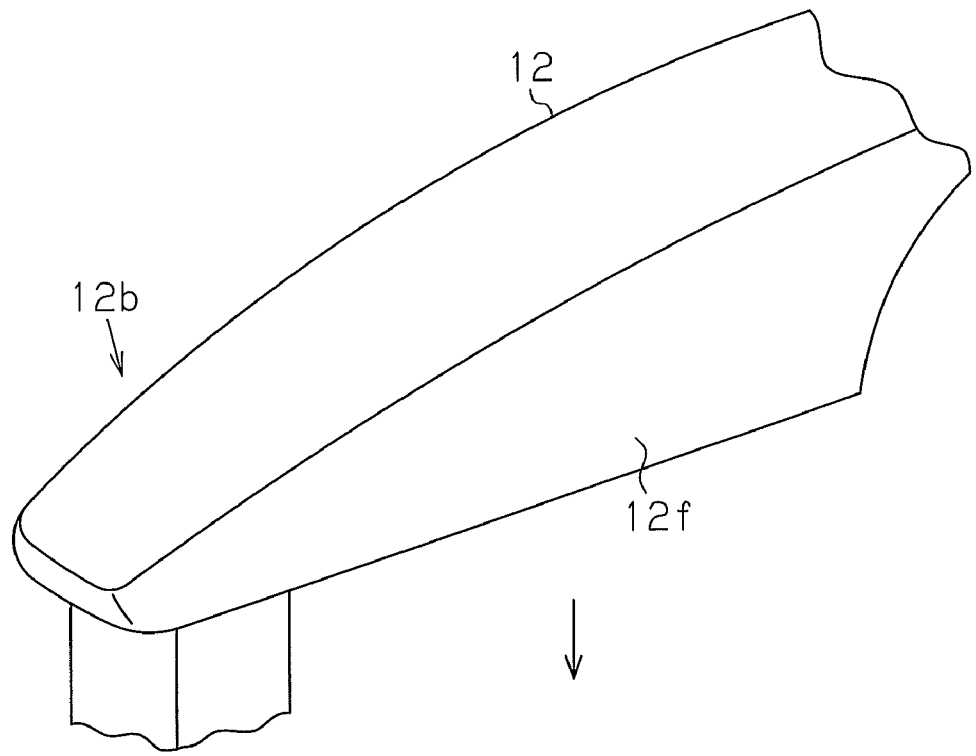
FIG. 5 is an exploded perspective view showing the structure of another example of the door handle device according to the present invention.
Figure 5:
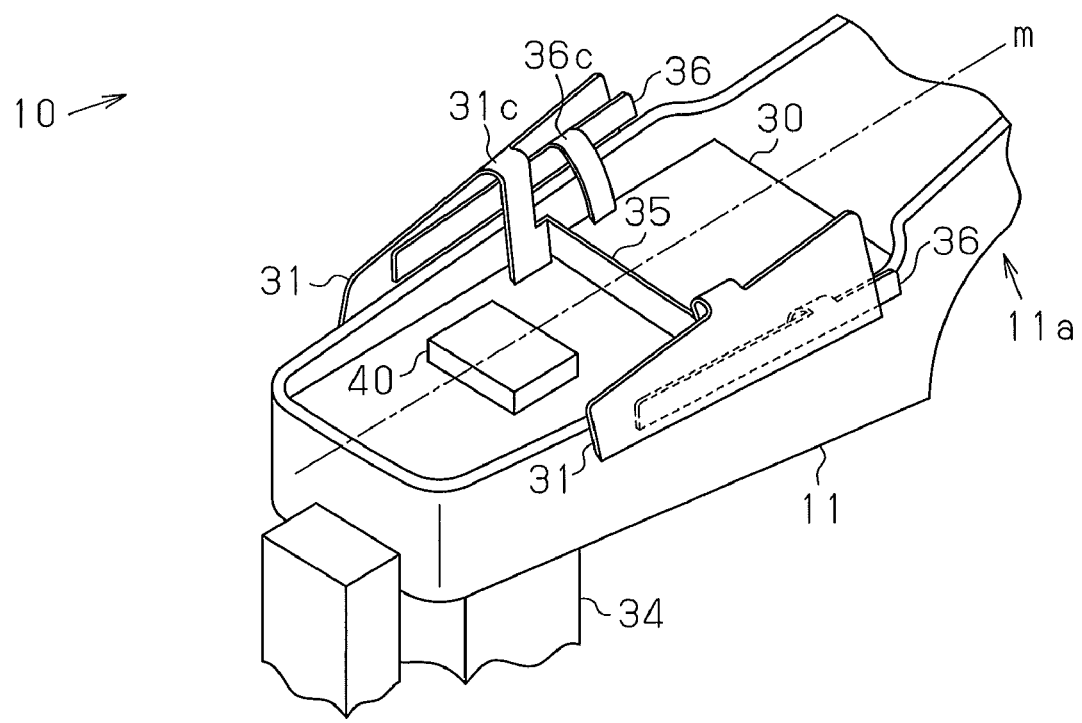
Figure 6:
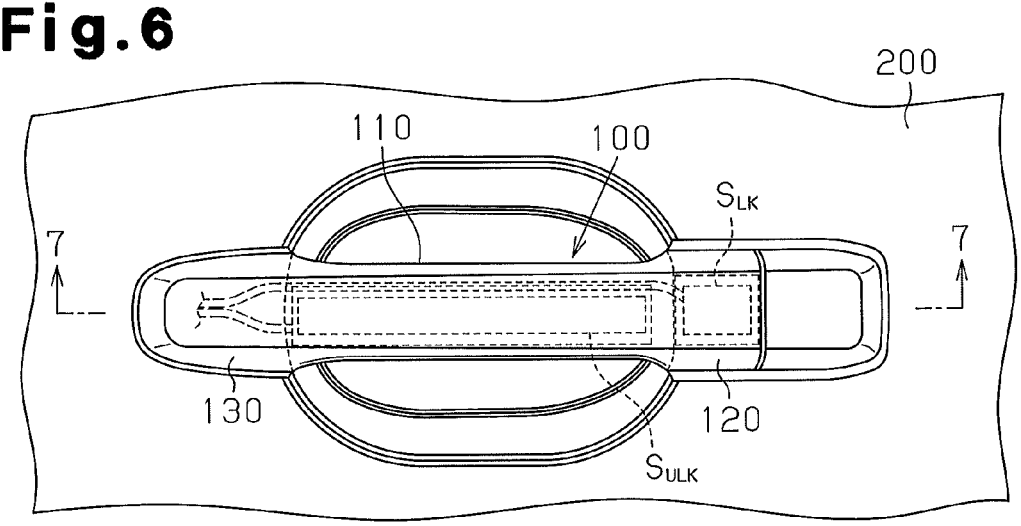
FIG. 6 is a front view showing a conventional door handle device.
Figure 7:
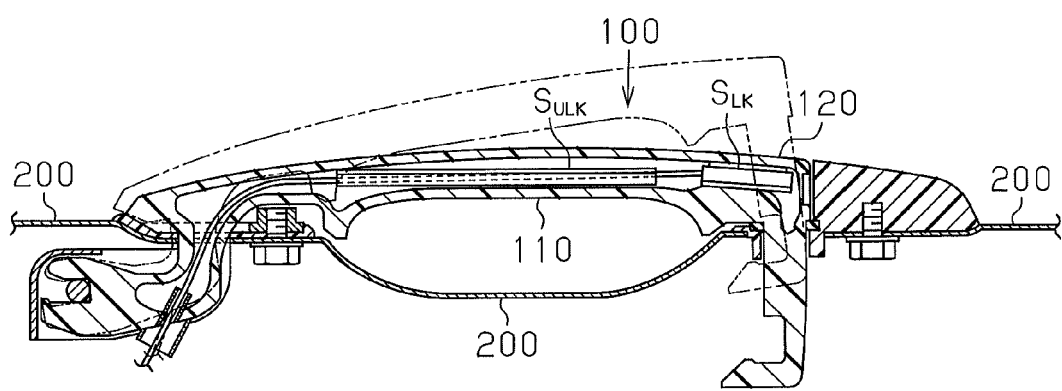
FIG. 7 is a cross-sectional view taken along line 7-7 in FIG. 6.

As shown in FIG. 5, the auxiliary electrodes 35 described above may be used as first auxiliary electrodes 35, and a pair of second auxiliary electrodes 36 may be arranged to respectively face the inner surfaces of the lock detection electrodes 31. Each of the second auxiliary electrodes 36 extends parallel to the corresponding lock detection electrode 31 and is spaced by a predetermined distance from the lock detection electrode 31. Each second auxiliary electrode 36 includes a connecting portion 36c, which serves as a supporting portion supported by the circuit substrate 30. The connecting portion 36c of each second auxiliary electrode 36 is electrically connected to the ground electrode GNDB of the circuit substrate 30. The second auxiliary electrode 36 and the lock detection electrode 31 are thus capacitance-coupled using the ground electrode of the circuit substrate 30 as ground GNDB. The capacitance (third capacitance) between the second auxiliary electrode 36 and the lock detection electrode 31 is connected in parallel to the first capacitance $C_{PANEL}$ and the second capacitance $C_{BOARD}$. This further increases the value of the capacitance using the ground electrode of the circuit substrate 30 as ground GNDB (second capacitance+third capacitance). Thus, the influence of a change in the capacitance $C_{PANEL}$ is further easily reduced. Moreover, the first auxiliary electrode 35 may be omitted and just the second auxiliary electrode 36 may be used.

In the above-described embodiment, the lock detection electrodes 31 are fixed to the circuit substrate 30, and the auxiliary electrode 35 is fixed to the circuit substrate 30 by the lock detection electrodes 31. Instead, the auxiliary electrode 35 may be directly fixed to the circuit substrate 30, and the lock detection electrodes 31 may be fixed to the circuit substrate 30 by the auxiliary electrode 35.

In the above-described embodiment, the auxiliary electrode 35 is arranged so that the relationship between the capacitance $C_{BOARD}$ and the capacitance $C_{PANEL}$ satisfies "$C_{PANEL}<C_{BOARD}$". However, the auxiliary electrode 35 may be arranged so that the relationship between the capacitance $C_{BOARD}$ and the capacitance $C_{PANEL}$ satisfies "$C_{PANEL}>C_{BOARD}$". That is, the auxiliary electrode capacitance-coupled to the ground electrode (GNDB) of the circuit substrate 30 only needs to connect the capacitance $C_{BOARD}$, which is formed by the auxiliary electrode, in parallel to the capacitance $C_{PANEL}$, which is formed between the lock detection electrode 31 and the outer panel 20. In such a structure, the influence of changes in the capacitance $C_{PANEL}$ between the lock detection electrode 31 and the outer panel 20 when the door handle 10 is pivoted are also reduced by the capacitance $C_{BOARD}$ formed by the auxiliary electrode in the capacitance sensor 41. This prevents erroneous detections by the capacitance sensor 41, and the vehicle door lock detection of the capacitance sensor 41 is performed with higher reliability.

The lock detection electrodes 31 do not necessarily have to be arranged in vertical symmetry. If the lock detection electrode is a single electrode, the lock detection electrode may be arranged at a position facing toward the inner surface of either the upper wall or the lower wall of the door handle in a state in which the door handle is attached to the vehicle as long as it is arranged between the grip and the first end of the door handle.

In the above-described embodiment, the first end 12b and the second end 12d are arranged in the second handle case 12. Instead, just one of the first end 12b and the second end 12d may be arranged in the first handle case 11. Further, the door handle 10 does not have to be formed from segments (11, 12) and may be formed integrally.

The pair of lock detection electrodes 31 and the auxiliary electrode 35 may be formed from a single member or from a plurality of members.

The invention claimed is:

1. A door handle device arranged in a door of a vehicle and capable of operating a door opening/closing mechanism of the vehicle, the door handle device comprising:
   a support member arranged at an inner side of an outer panel of the door;
   a door handle arranged on an outer side of the outer panel and including a first end, a second end, a grip arranged between the first and second ends and defining a gap with an outer surface of the outer panel, a pivot portion extending through the outer panel from the first end and pivotally supported by the support member, and an operation portion extending through the outer panel from the second end so as to be capable of operating the opening/closing mechanism;
   a circuit substrate arranged in the door handle and including a ground electrode;
   a lock detection electrode mounted on the circuit substrate and capacitance-coupled to the outer panel;
   a capacitance sensor connected to the lock detection electrode, which detects issuance of a door lock command based on a change in a first capacitance between the outer panel and the lock detection electrode;
   an auxiliary electrode capacitance-coupled to the ground electrode to form a second capacitance connected in parallel to the first capacitance between the auxiliary electrode and the ground electrode;
   wherein the lock detection electrode and the auxiliary electrode are integrally formed;
   wherein the handle includes a case having an upper wall and a lower wall, which face toward each other;
   the lock detection electrode includes two electrodes arranged in symmetry with respect to a center line extending from the first end to the second end along the middle of the space between the upper wall and the lower wall; and
   the auxiliary electrode electrically and mechanically connects the two electrodes.

2. The door handle device according to claim 1, wherein the lock detection electrode is arranged between the grip and the first end.

3. The door handle device according to claim 1, wherein the second capacitance is greater than the first capacitance.

4. The door handle device according to claim 1, wherein the handle includes a case having an upper wall and a lower wall, which face toward each other;
   the lock detection electrode is arranged proximal to and facing toward an inner surface of at least one of the upper wall and the lower wall; and
   the auxiliary electrode is plate-shaped and extends from the lock detection electrode so as to be arranged upright on the circuit substrate.

5. The door handle device according to claim 1, wherein the lock detection electrode is arranged as a pair in a vertical direction with respect to the handle, and the auxiliary electrode is connected to the pair of lock detection electrodes.

6. The door handle device according to claim 1, wherein the auxiliary electrode and the lock detection electrode are formed through pressing.

7. The door handle device according to claim 1, wherein the lock detection electrode includes a supporting portion supported by the circuit substrate, and the auxiliary electrode is supported by the lock detection electrode on the circuit substrate.

8. The door handle device according to claim 1, wherein the auxiliary electrode is a first auxiliary electrode and further includes a second auxiliary electrode capacitance-coupled to the lock detection electrode so as to form a third capacitance connected in parallel to the first capacitance between the second auxiliary electrode and the lock detection electrode.

9. The door handle device according to claim 8, wherein the second auxiliary electrode includes a supporting portion supported by the circuit substrate and electrically connected to the ground electrode.

10. The door handle device according to claim 1, further comprising:
    an unlock detection electrode arranged in the grip and capacitance-coupled to the outer panel; and
    a capacitance sensor connected to the unlock detection electrode, which detects issuance of an unlock command is issued based on a change in the capacitance between the outer panel and the unlock detection electrode.

11. A door handle device for use with a door of a vehicle in operating a door opening/closing mechanism of the vehicle, wherein the door includes an outer panel having inner and outer sides, the door handle device comprising:
    a support member mountable at the inner side of the outer panel of the door;

a door handle mountable on the outer side of the outer panel and including a first end, a second end, a grip arranged between the first and second ends and defining a gap with an outer surface of the outer panel, a pivot portion extending through the outer panel from the first end and pivotally supported by the support member, and an operation portion extending through the outer panel from the second end so as to be capable of operating the opening/closing mechanism;

a circuit substrate arranged in the door handle and including a ground electrode;

a lock detection electrode mounted on the circuit substrate and capacitance-coupled to the outer panel;

a capacitance sensor connected to the lock detection electrode, which detects issuance of a door lock command based on a change in a first capacitance between the outer panel and the lock detection electrode;

an auxiliary electrode capacitance-coupled to the ground electrode to form a second capacitance connected in parallel to the first capacitance between the auxiliary electrode and the ground electrode;

wherein the lock detection electrode and the auxiliary electrode are integrally formed;

wherein the lock detection electrode is arranged between the grip and the first end;

wherein the handle includes a case having an upper wall and a lower wall, which face toward each other;

the lock detection electrode includes two electrodes arranged in symmetry with respect to a center line extending from the first end to the second end along the middle of the space between the upper wall and the lower wall; and the auxiliary electrode electrically and mechanically connects the two electrodes.

12. The door handle device according to claim 11, wherein the second capacitance is greater than the first capacitance.

13. The door handle device according to claim 11, wherein the handle includes a case having an upper wall and a lower wall, which face toward each other;

the lock detection electrode is arranged proximal to and facing toward an inner surface of at least one of the upper wall and the lower wall; and the auxiliary electrode is plate-shaped and extends from the lock detection electrode so as to be arranged upright on the circuit substrate.

14. The door handle device according to claim 11, wherein the lock detection electrode is arranged as a pair in a vertical direction with respect to the handle, and the auxiliary electrode is connected to the pair of lock detection electrodes.

15. The door handle device according to claim 11, wherein the lock detection electrode includes a supporting portion supported by the circuit substrate, and the auxiliary electrode is supported by the lock detection electrode on the circuit substrate.

* * * * *